United States Patent [19]
Tanaka et al.

[11] Patent Number: 6,133,992
[45] Date of Patent: Oct. 17, 2000

[54] DISTANCE MEASUREMENT APPARATUS

[75] Inventors: Tomohiro Tanaka, Kanagawa; Hisashi Yoshida, Tokyo, both of Japan

[73] Assignee: Nikon Corporation, Tokyo, Japan

[21] Appl. No.: 09/238,143

[22] Filed: Jan. 28, 1999

[30]  Foreign Application Priority Data

Jan. 28, 1998  [JP]  Japan .................................. 10-015194

[51] Int. Cl.[7] .................................. G01C 3/08; G04F 8/00
[52] U.S. Cl. ........................ 356/5.07; 356/5.08; 368/118; 368/120
[58] Field of Search ................................. 356/5.05, 5.08, 356/5.06, 5.07; 368/118, 120

[56]       References Cited

U.S. PATENT DOCUMENTS

| | | | |
|---|---|---|---|
| 3,541,448 | 11/1970 | Nutt ........................................ | 324/186 |
| 4,982,350 | 1/1991 | Perma et al. ............................ | 368/121 |
| 5,148,175 | 9/1992 | Woolfolk . | |
| 5,262,837 | 11/1993 | Shyy . | |
| 5,504,570 | 4/1996 | Akasu .................................... | 356/5.05 |
| 5,552,878 | 9/1996 | Dillard .................................. | 356/5.07 |
| 5,745,442 | 4/1998 | Herscher ............................... | 356/5.08 |

*Primary Examiner*—Stephen C. Buczinski
*Attorney, Agent, or Firm*—Foley & Lardner

[57]          ABSTRACT

A distance measurement apparatus for measuring distance to the target by measuring a time elapsed from the emission of pulsed light to the target until the receiving thereof. This apparatus comprising a light-emitting section, a light-receiving section, a delay circuit for delaying at least one of generation of the trigger signal with respect to a measurement start signal and the outputting of the measurement stop signal with respect to the reflected pulsed light and outputting thus delayed signal, a reference clock section, time measuring sections consisting of a start-side and stop-side fractional time signal measurement sections and a counter section, and a distance measurement section for determining, based thus measured items, the distance to the target according to the time from the emission of the pulsed light to the receiving thereof.

6 Claims, 12 Drawing Sheets

CLOCK SIGNAL (S13)

MEASUREMENT START SIGNAL(S2)

S20(Q1)

DELAY SIGNAL S3(Q2)

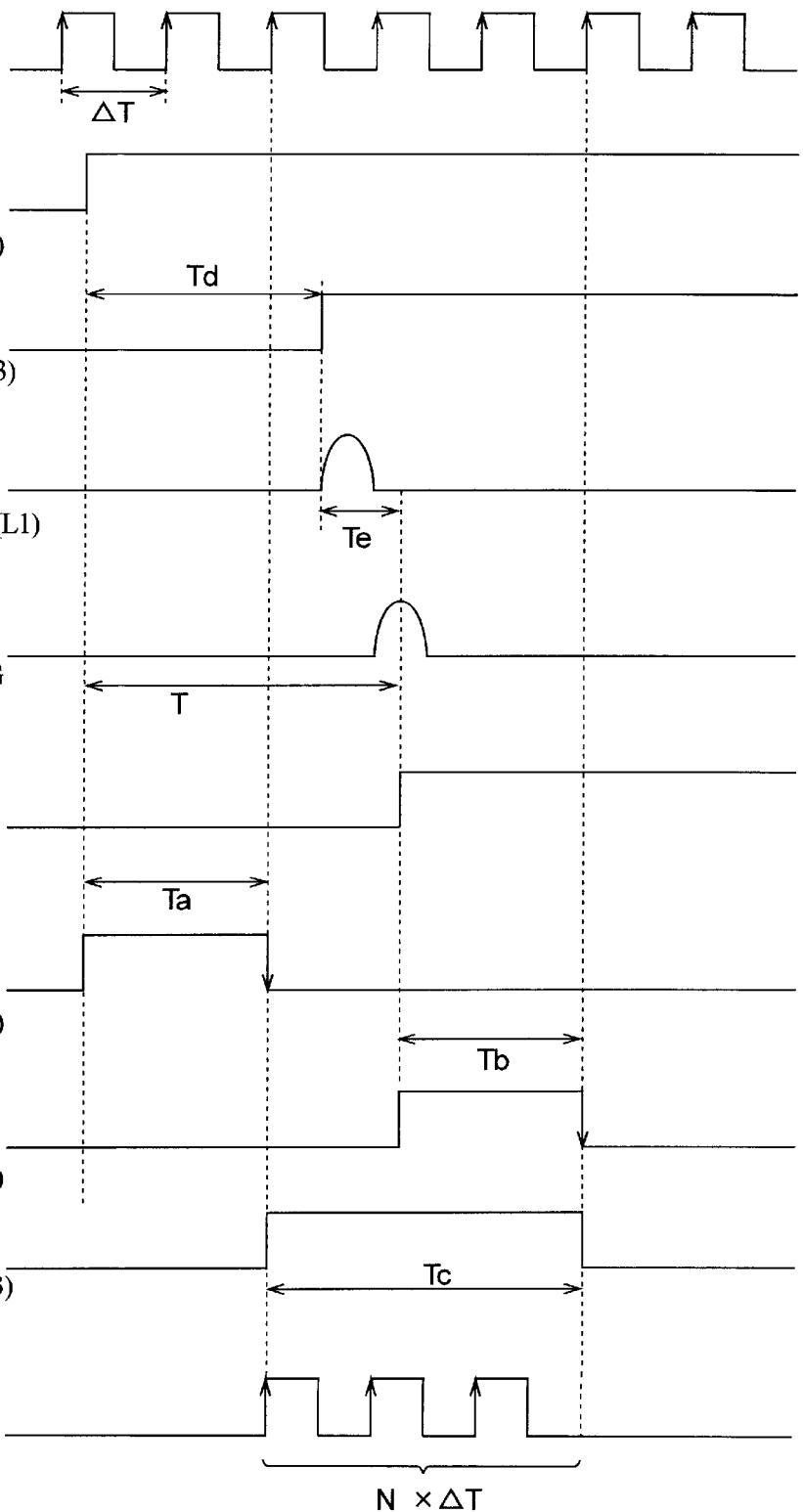

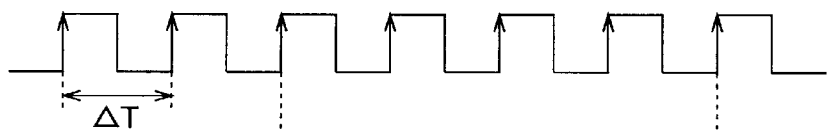
*Fig.8A* REF CLOCK SIGNAL (S30)
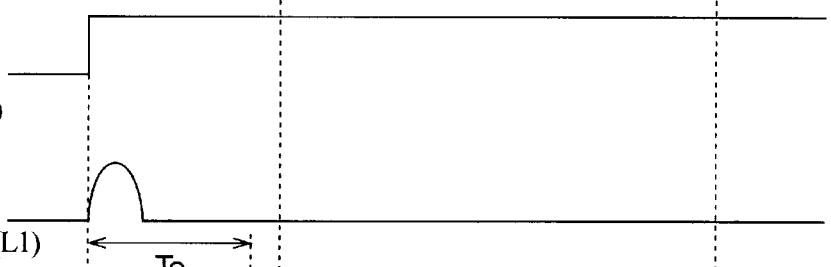
*Fig.8B* MEASUREMENT START SIGNAL (S2)
*Fig.8C* EMISSION PULSE (L1)
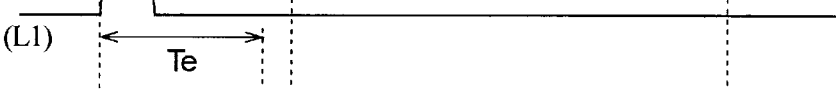
*Fig.8D* LIGHT-RECEIVING SIGNAL (S5)
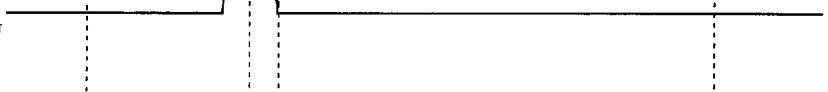
*Fig.8E* COMPARATOR SIGNAL (S9)
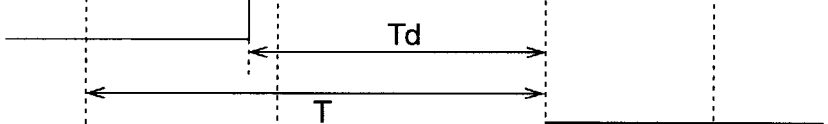
*Fig.8F* MEASUREMENT STOP SIGNAL (S40)
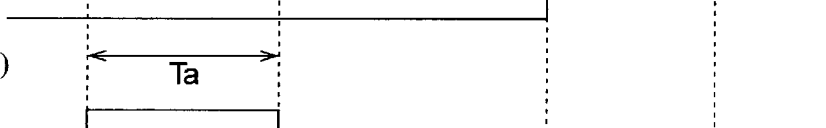
*Fig.8G* START-SIDE FRACTIONAL TIME SIGNAL (S31)
*Fig.8H* STOP-SIDE FRACTIONAL TIME SIGNAL (S32)
*Fig.8I* GATE SIGNAL (S33)
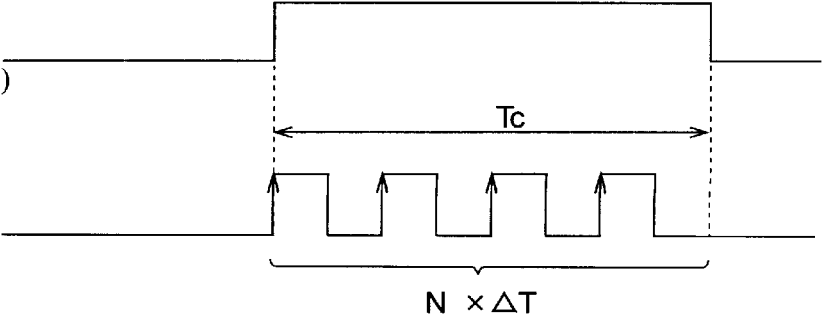
*Fig.8J* ROUGH COUNT SIGNAL (S34)

*Fig.10A* REF CLOCK SIGNAL (S30)
*Fig.10B* MEASUREMENT START SIGNAL (S2)
*Fig.10C* DELAY SIGNAL (S3)
*Fig.10D* EMISSION PULSE (L1)
*Fig.10E* LIGHT-RECEIVING SIGNAL (S5)
*Fig.10F* COMPARATOR SIGNAL (S9)
*Fig.10G* MEASUREMENT STOP SIGNAL (S40)
*Fig.10H* START-SIDE FRACTIONAL TIME SIGNAL (S31)
*Fig.10I* STOP-SIDE FRACTIONAL TIME SIGNAL (S32)
*Fig.10J* GATE SIGNAL (S33)
*Fig.10K* ROUGH COUNT SIGNAL (S34)
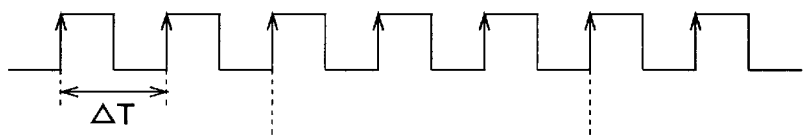
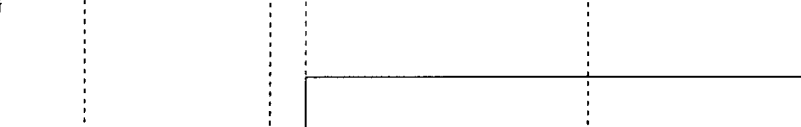
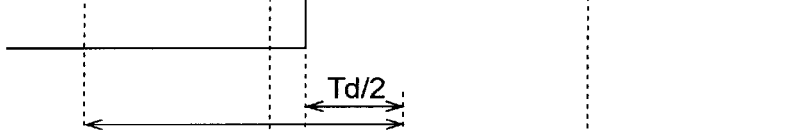
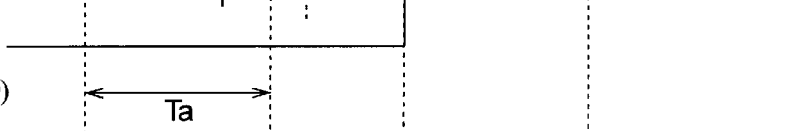
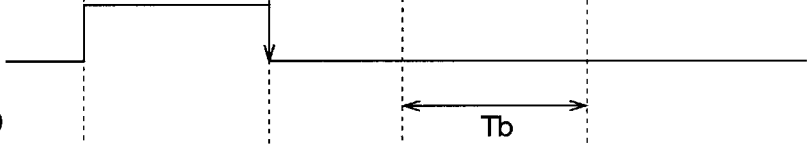
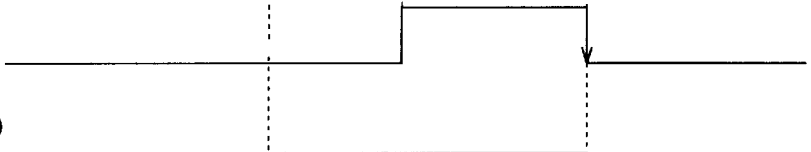
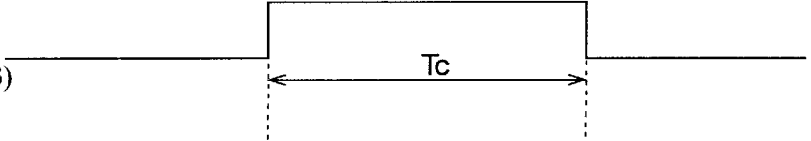
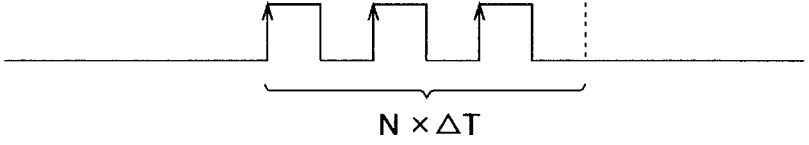

Fig.12A REF CLOCK (S30)

Fig.12B LASER EMISSION TRIGGER (S50)
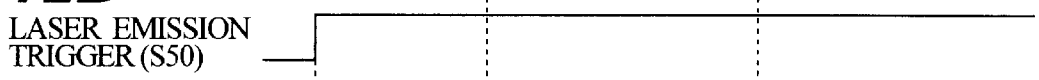

Fig.12C EMISSION PULSE (L1)

Fig.12D LASER EMISSION MONITOR (S51)

Fig.12E AMP OUTPUT (S52) —THRESHOLD
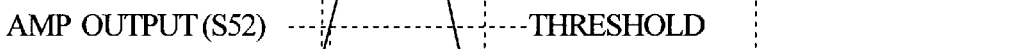

Fig.12F MEASUREMENT START SIGNAL (S2)
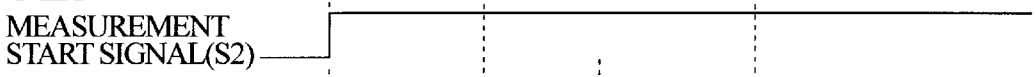

Fig.12G LIGHT-RECEIVING SIGNAL (S5)

Fig.12H COMPARATOR SIGNAL (S9)
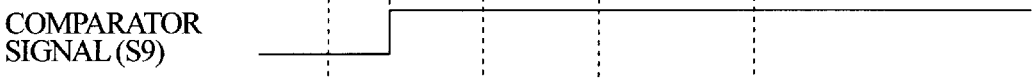

Fig.12I MEASUREMENT STOP SIGNAL (S40)
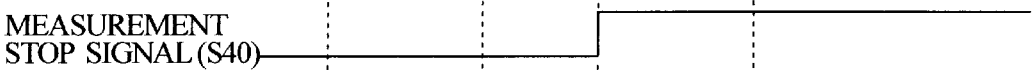

Fig.12J START-SIDE FRACTIONAL TIME SIGNAL (S31)

Fig.12K STOP-SIDE FRACTIONAL TIME SIGNAL (S32)

Fig.12L GATE SIGNAL (S33)

Fig.12M ROUGH COUNT SIGNAL (S34)
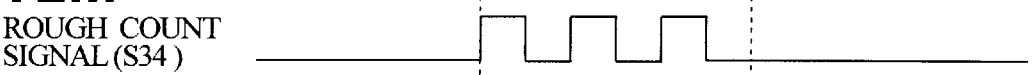

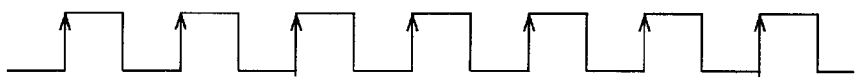
Fig.13A REF CLOCK
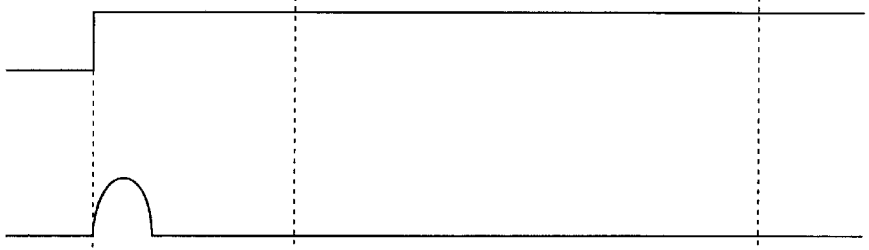
Fig.13B MEASUREMENT START SIGNAL (S50)
Fig.13C EMISSION PULSE (L50)
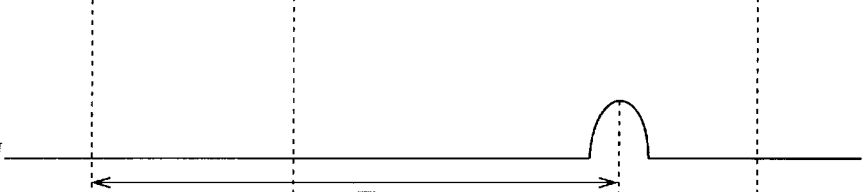
Fig.13D LIGHT-RECEIVING SIGNAL (S52)
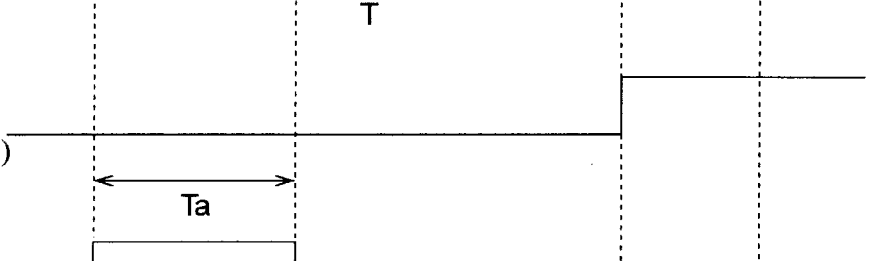
Fig.13E MEASUREMENT STOP SIGNAL (S53)
Fig.13F START-SIDE FRACTIONAL TIME SIGNAL
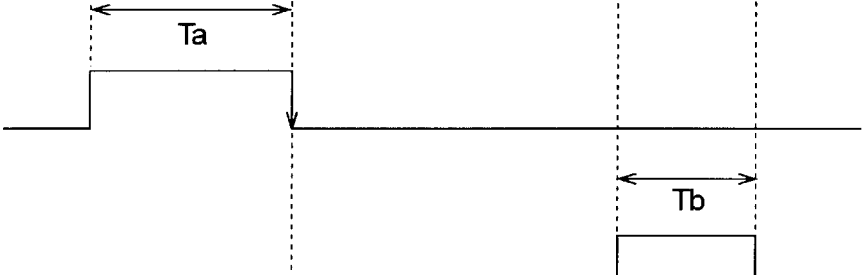
Fig.13G STOP-SIDE FRACTIONAL TIME SIGNAL
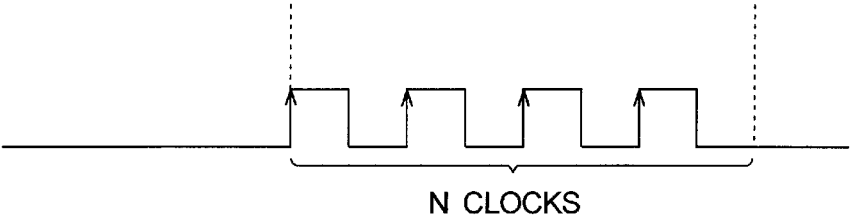
Fig.13H ROUGH COUNT SIGNAL
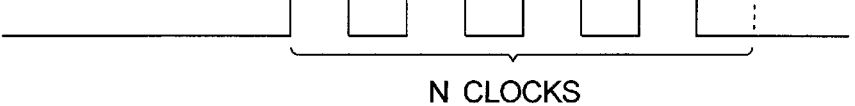
N CLOCKS

START-SIDE
FRACTIONAL
TIME SIGNAL

STOP-SIDE
FRACTIONAL
TIME SIGNAL

DISTANCE MEASUREMENT APPARATUS

BACKGROUND OF THE INVENTION

1. Field of the Invention

The present invention relates to a distance measurement apparatus; and, in particular, to a pulsed light type distance measurement apparatus which emits pulsed light toward a target to be measured and determines the distance to the target according to the time elapsed from the emission of light until the receiving the pulsed light reflected by the target.

2. Related Background Art

There has been known a pulsed light type distance measurement apparatus which emits pulsed light toward a target to be measured, receives the pulsed light reflected by the target, and determines the distance to the target according to the time elapsed from the emission of light until the receiving thereof.

FIGS. 13A to 13H show an example of timing charts for measurement operations during the time from the emission to receiving in such a pulsed light type distance measurement apparatus. The operations of the measurement apparatus are controlled according to the reference clock shown in FIG. 13A. At the point in time where the measurement start signal S50 shown in FIG. 13B, which also acts as an emission trigger signal, is switched from Low level to High level, an emission pulse L50 is emitted toward a target as shown in FIG. 13C. The light reflected by the target is received and is converted into an electric signal by a photoelectric converter, so as to yield a light-receiving signal S52 shown in FIG. 13D. Then generated is a measurement stop signal S53 which switches from Low level to High level at the peak point of the light-receiving signal S52. The time difference T between the rising of the measurement start signal S50 and the rising of the measurement stop signal S53 corresponds to the time difference between the emission and receiving.

For measuring the time T with an accuracy higher than the cycle of the reference clock, there has been known a technique in which a fractional time Ta (see FIG. 13F) corresponding to the time elapsed from the rising of measurement start signal S50 until the rising of the second reference clock therefrom, for example, and a fractional time Tb (see FIG. 13G) corresponding to the time elapsed from the rising of measurement stop signal S53 until the rising of the second reference clock therefrom, for example, are determined by a time/voltage converter, and the reference clock number N (see FIG. 13H) from the end of Ta to the end of Tb is counted.

SUMMARY OF THE INVENTION

In such an apparatus, however, there is a possibility that, in the case of short distance measurement in which the time T from the emission to receiving is short, the rising time of Ta and the falling time of Tb may be so close to each other that an overlap occurs, whereby their waveforms may be disturbed upon simultaneous switching as shown in FIGS. 14A and 14B. If the waveforms of signal edges are disturbed upon simultaneous switching of the start-side and stop-side fractional time signals, then their edge positions, i.e., their respective pulse widths Ta and Tb, cannot correctly be measured. As a consequence, errors in measurement of start-side and stop-side fractional times will increase, so that the time from the emission of pulsed light to the receiving thereof cannot correctly be measured, whereby the accuracy in measurement of the distance to the target will deteriorate.

Therefore, it is an object of the present invention to provide a distance measurement apparatus which eliminates errors in measurement of fractional times, thereby improving the accuracy in short distance measurement.

In order to achieve the above-mentioned object, the distance measurement apparatus in accordance with the present invention comprises the following constituents a) to j):

a) a light-emitting section for emitting pulsed light toward a target in response to an emission trigger signal based on a measurement start signal;

b) a light-receiving section for outputting a measurement stop signal in response to the receiving of the pulsed light reflected by the target;

c) a delay circuit for delaying at least one of generation of the emission trigger signal with respect to the measurement start signal and the outputting of the measurement stop signal with respect to the receiving of reflected pulsed light;

d) a reference clock section for generating a reference clock;

e) a start-side fractional time signal generating section for outputting a start-side fractional time signal pulse corresponding to a period of time from the measurement start signal to the reference clock issued later than a predetermined time therefrom;

f) a start-side fractional time measurement section for measuring a pulse width of the start-side fractional time signal pulse;

g) a stop-side fractional time signal generating section for outputting a stop-side fractional time signal pulse corresponding to a period of time from the measurement stop signal to the reference clock issued later than a predetermined time therefrom;

h) a stop-side fractional time measurement section for measuring a pulse width of the stop-side fractional time signal pulse;

i) a counter section for measuring a lapse clock number of the reference clock from an end of the start-side fractional time signal pulse to an end of the stop-side fractional time signal pulse; and j) a distance measurement section for determining the time from the emission of the pulsed light to the receiving thereof according to the outputs of the start-side and stop-side fractional time measurement sections and the lapse clock number, thereby yielding the distance to the target.

In accordance with the present invention, since the delay circuit of c) is provided, as the emission trigger signal is delayed with respect to the measurement start signal and/or the measurement stop signal is delayed with respect to the receiving of reflected pulsed light, the measurement start signal and the measurement stop signal can sufficiently be separated from each other in terms of time. As a result, the start-side fractional time signal pulse and the stop-side fractional time signal pulse are shifted from each other in terms of time. These pulses would not overlap each other, when the delay time itself in the case of delaying one of the emission trigger signal and measurement stop signal or the sum of delay times in the case of delaying both of the signals is made greater than the maximum value of the start-side fractional time signal pulse width. As a consequence, the error in measurement of fractional times caused by simultaneous switching would be eliminated, whereby the accuracy in short distance measurement would improve.

In particular, in the case of delaying both of the signals, the delay time setting of each signal can be set to a short period of time which is adjustable with high accuracy, whereby, even when the sum of delay times is long, the total delay time can be set with higher accuracy than in the case of delaying only one of the signals.

Further, in accordance with the present invention, the respective pulse widths of start-side fractional time signal pulse and stop-side fractional time signal pulse are measured by fractional time measurement sections separated from each other. Therefore, even when the start-side fractional time signal pulse and the stop-side fractional time signal pulse are close to each other, the respective pulse widths of these fractional time signal pulses can be measured with high accuracy, and the total measurement time can be shortened. Usually, in a distance measurement apparatus, several thousand measured values are averaged for improving the accuracy in measurement, and the result thereof is outputted or displayed. For preventing errors in measurement from occurring upon simultaneous switching, it is preferred that the start-side fractional time signal pulse and stop-side fractional time signal pulse be separated from each other as much as possible in terms of time. This would elongate the total measurement time, however. The present invention has fractional time measurement sections independent of each other, so that both signals can be made as close to each other as possible in terms of time while keeping them from overlapping each other, thereby being capable of preventing errors in measurement from occurring upon simultaneous switching and allowing the total measurement time to decrease.

The distance measurement apparatus in accordance with another aspect of the present invention comprises the following constituents 1) to 11):

1) a light-emitting section for emitting pulsed light toward a target in response to an emission trigger signal;
2) an emission detecting section for outputting a measurement start signal in response to the emission of the light-emitting section;
3) a light-receiving section for outputting a measurement stop signal in response to the receiving of the pulsed light reflected by the target;
4) a delay circuit for delaying the outputting of the measurement stop signal;
5) a reference clock section for generating a reference clock;
6) a start-side fractional time signal generating section for outputting a start-side fractional time signal pulse corresponding to a period of time from the measurement start signal to the reference clock issued later than a predetermined time therefrom;
7) a start-side fractional time measurement section for measuring a pulse width of the start-side fractional time signal pulse;
8) a stop-side fractional time signal generating section for outputting a stop-side fractional time signal pulse corresponding to a period of time from the delayed measurement stop signal to the reference clock issued later than a predetermined time therefrom;
9) a stop-side fractional time measurement section for measuring a pulse width of the stop-side fractional time signal pulse;
10) a counter section for measuring a lapse clock number of the reference clock from an end of the start-side fractional time signal pulse to an end of the stop-side fractional time signal pulse; and
11) a distance measurement section for determining the time from the emission of the pulsed light to the receiving thereof according to the outputs of the start-side and stop-side fractional time measurement sections and the lapse clock number, thereby yielding the distance to the target.

In accordance with this aspect of the present invention, since the measurement stop signal is delayed by the delay circuit of 4), the measurement start signal and the measurement stop signal can sufficiently be separated from each other in terms of time. As a result, the start-side fractional time signal pulse and the stop-side fractional time signal pulse are shifted from each other in terms of time. When the delay time is made greater than the maximum value of the start-side fractional time signal pulse width, then these pulses would not overlap each other in terms of time. As a consequence, the error in measurement of fractional times caused by simultaneous switching would be eliminated, whereby the accuracy in short distance measurement would improve.

Also, since the actual emission of the pulsed light is employed as the measurement start signal, the correct time from the emission to receiving can be determined even when there is a temporal shift between the emission trigger signal and the pulsed light emission. Therefore, measurement with higher accuracy is possible.

Further, the respective pulse widths of start-side fractional time signal pulse and stop-side fractional time signal pulse are measured by fractional time measurement sections separated from each other in accordance with this aspect of the present invention as well. Therefore, even when the start-side fractional time signal pulse and the stop-side fractional time signal pulse are close to each other, the respective pulse widths of these fractional time signal pulses can be measured with high accuracy, and the total measurement time can be shortened.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIGS. 6A to 6J are timing charts for explaining measurement operations of the apparatus shown in FIG. 1;

FIGS. 8A to 8J are timing charts for explaining measurement operations of the apparatus shown in FIG. 7;

FIGS. 10A to 10K are timing charts for explaining measurement operations of the apparatus shown in FIG. 9;

FIGS. 12A to 12M are timing charts for explaining measurement operations of the apparatus shown in FIG. 11;

FIGS. 13A to 13H are timing charts for explaining measurement operations of a conventional distance measurement apparatus.

DESCRIPTION OF THE PREFERRED EMBODIMENTS

Figure 1:
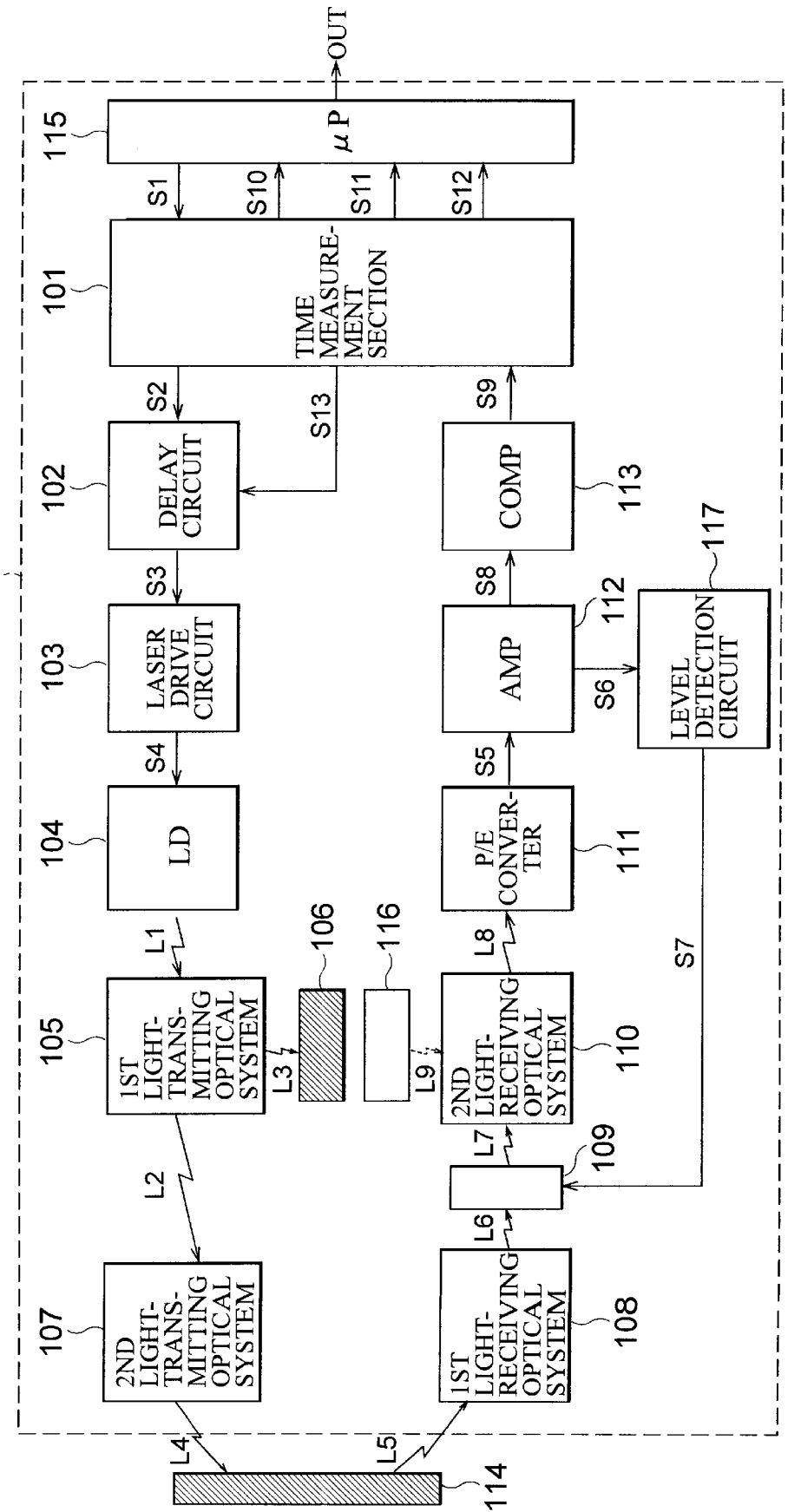
FIG. 1 is a block diagram showing a first embodiment of the distance measurement apparatus in accordance with the present invention.

In the following, some of preferred embodiments of the present invention will be explained with reference to the accompanying drawings. To facilitate the comprehension of the explanation, the same reference numerals denote the same parts, where possible, throughout the drawings, and a repeated explanation will be omitted.

FIG. 1 is a block diagram of a distance measurement apparatus 100 which is a first embodiment in accordance with the present invention. A microprocessor 115 outputs a measurement start command signal S1 for starting measurement operations to a time measurement section 101; determines a distance to a target 114 according to measurement data S10, S11, and S12 fed therein from the time measurement section 101; and outputs thus determined distance to an OUT terminal.

According to the measurement start command signal S1 from the microprocessor 115, the time measurement section 101 outputs a measurement start signal S2 to a delay circuit 102 and measures a measurement time T. The measurement time T is a period of time elapsed from when the measurement start signal S2 becomes High level until a measurement stop signal S9 outputted from a comparator section 113 which will be explained later attains High level. The signal S13 depicted herein is a clock signal for controlling the emission of pulsed light, which is generated by the time measurement section 101 and is used for adding a predetermined delay time Td to the measurement start signal S2.

The delay circuit 102 is used for delaying the measurement start signal S2 by the delay time Td to generate a signal S3, and outputs this signal S3 to a laser drive circuit 103.

The laser drive circuit 103 outputs, in synchronization with the signal S3, a laser drive signal S4 for driving a laser diode 104 to the latter.

A first light-transmitting optical system 105 connected to the laser diode 104 incorporates therein a half mirror for splitting the incident pulsed light L1 into pulsed light L2 and pulsed light L3, and the like. The pulsed light L2 is directed to an outer optical path for emitting light out of the apparatus, whereas the pulsed light L3 is directed to an inner optical path which forms an optical path only within the apparatus.

Disposed on the exit side of the first lighttransmitting optical system 105 is a movable optical path switching sector 106 which blocks one of the optical paths of the pulsed light L2 and pulsed light L3, thereby selecting the inner or outer optical path. FIG. 1 shows the state where the optical path switching sector 106 blocks the pulsed light L3, thus selecting the outer optical path.

Disposed on the inner optical path are an inner optical attenuator 116 for adjusting the quantity of light to a predetermined level, and a second light-receiving optical system 110 which will be explained later. Disposed on the outer optical path, on the other hand, is a second light-transmitting optical system 107 which emits pulsed light L4 to the target 114.

A first light-receiving optical system 108 receives pulsed light L5 reflected by the target 114 and is optically connected, by way of an outer optical attenuator 109 for adjusting the quantity of light, to the second light-receiving optical system 110. Among them, the outer optical attenuator 109 has a density or transmissivity which can continuously be changed by an output signal of a level detection circuit 117 which will be explained later.

The second light-receiving optical system includes therein a half mirror and the like, and guides the pulsed light L3 or L7 introduced from the outer or inner optical path to a photoelectric converter section 111 as pulsed light L8.

The photoelectric converter section 111 comprises an optical band-pass filter, a light-receiving device, a current/voltage converter device, and the like, and generates an electric light-receiving signal S5 in response to the receiving of the pulsed light L8. The output of the photoelectric converter section 111 is connected to the input side of an amplifier section 112, which outputs the signal S8 in which the input signal S5 has been amplified and a signal S6 which is proportional to the magnitude of the input signal S5. A comparator section 113 is connected to the amplifier section 112 such as to receive the signal S8, whereas the level detection circuit 117 is connected to the amplifier section 112 such as to receive the signal S6.

The comparator section 113 includes a peak detection circuit, outputs a stop signal S9 which is switched to High level in response to a peak point of the signal S8, and is connected to the time measurement section 101.

Figure 2:
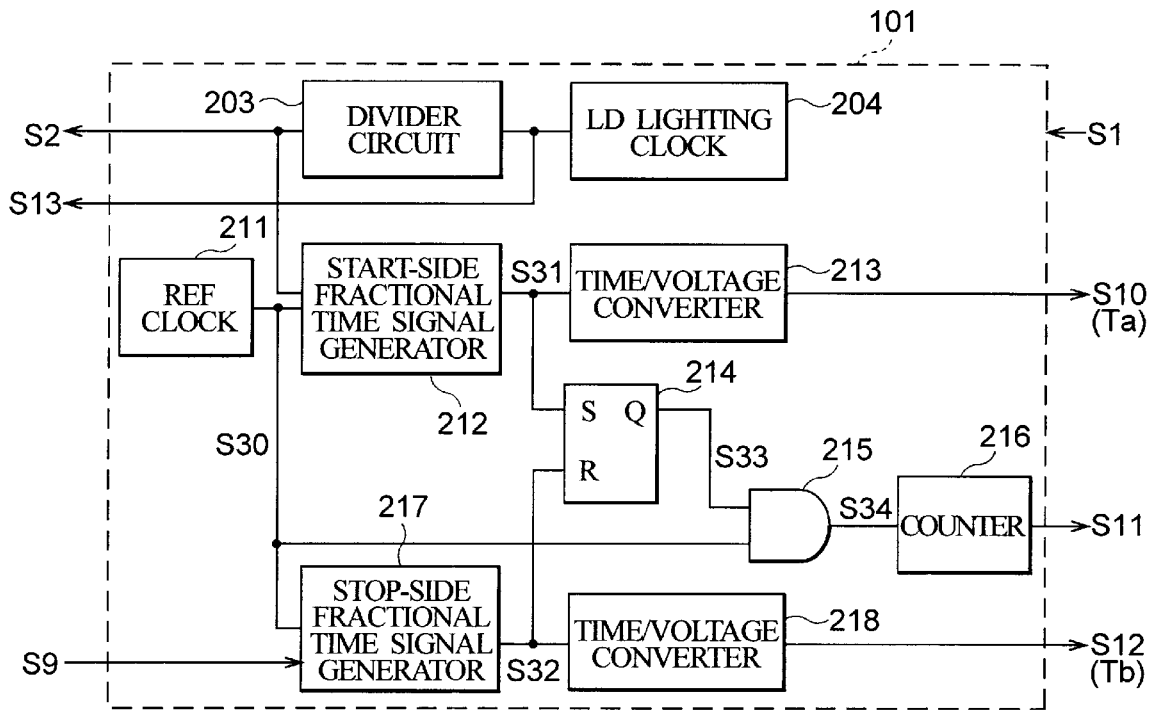
FIG. 2 is a block diagram showing the time measurement section of the apparatus shown in FIG. 1.

FIG. 2 is a detailed block diagram of the time measurement section 101 in this embodiment.

The time measurement section 101 is provided with a laser diode lighting clock oscillator (hereinafter referred to as LD lighting clock) 204 for generating the clock signal S13. The clock signal S13 of the LD lighting clock 204 is split into two, one of which becomes an output of the time measurement section 101 as it is, whereas the other is connected to an input end of a divider circuit 203. The output S2 of the divider circuit 203 is also split into two, one of which becomes an output of the time measurement section 101, whereas the other is connected to an input end of a start-side fractional time signal generator 212.

The time measurement section 101 further comprises a reference clock oscillator 211 for generating a reference clock signal S30 for the whole system, and the output end of the reference clock oscillator 211 is connected to one input end each of the start-side fractional time signal generator 212, a stop-side fractional time signal generator 217, and an AND circuit 215. Fed into an input end of the stop-side fractional time signal generator 217 is the measurement stop signal S9.

Among them, the start-side or stop-side fractional time signal generator 212, 217 is turned on when the measurement start signal S2 or measurement stop signal S9 becomes High level, and then generates a signal S31, S32 whose pulse width is a time Ta or Tb elapsed until the occurrence of the reference clock signal S30 issued after the lapse of a predetermined time.

Each of the outputs of the start-side and stop-side fractional time signal generators 212 and 217 is split into two, one pair of these signals are connected to S and R terminals of an SR flip-flop 214, respectively. Outputted from the Q terminal of the SR flip-flop 214 is a gate signal S33 which attains H level during the period from the falling edge of the pulse signal S31 to the falling edge of the pulse signal S32. This Q terminal is connected to an input end of the AND circuit 215 which is different from the input end for the reference clock signal S30. The output end of the AND circuit 215 is connected to a counter 216, whose output signal is the signal S11.

Figure 3:
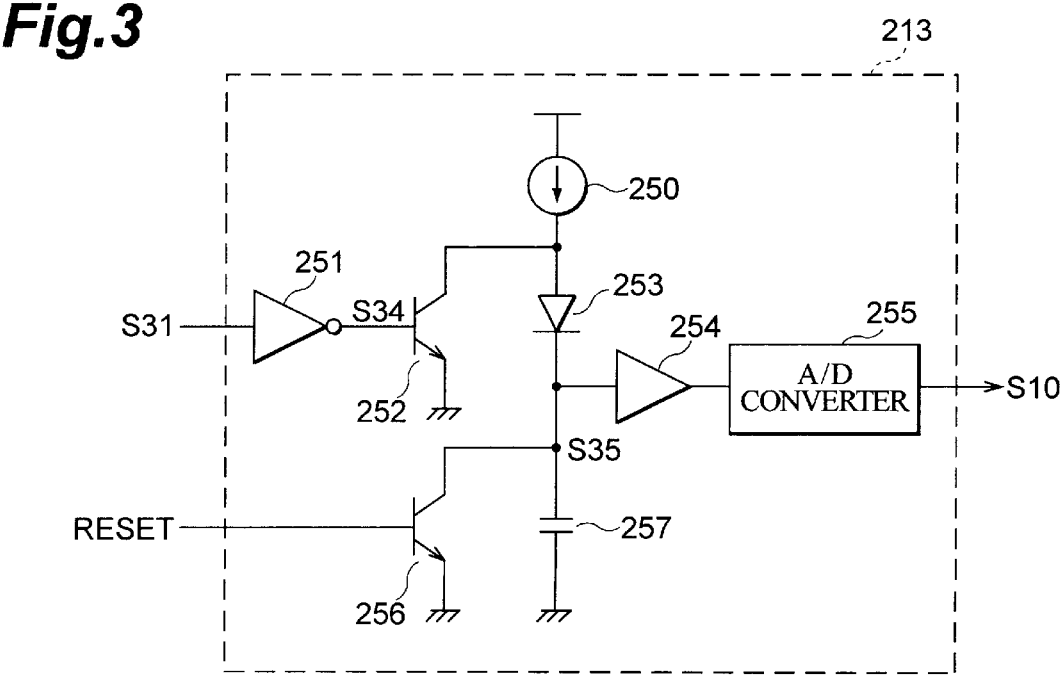
FIG. 3 is a block diagram showing a time/voltage converter of the time measurement section shown in FIG. 2.

The other pair of split outputs of the start-side and stop-side fractional time signal generators 212 and 217 are connected to time/voltage converters 213 and 218, respectively. These time/voltage converters 213 and 218 convert the respective pulse widths of the start-side fractional time signal S31 and stop-side fractional time signal S32 into analog voltages, and thus obtained analog voltages into the digital data signals S10 and S12, which are then outputted to the microprocessor 115. FIG. 3 shows their specific block diagram. Though the time/voltage converter 213 is depicted here, the time/voltage converter 218 has a similar configuration.

The time/voltage converter 213 is constituted by a constant-current circuit 250, an inverter 251, npn transistors 252, 256, a diode 253, an amplifier 254, an A/D converter 255, and a capacitor 257.

The signal input end (for receiving the signal S31) of the time/voltage converter 213 is connected to the input end of the inverter 251, whereas the output end of the inverter 251 is connected to the base terminal of the transistor 252. The base terminal of the transistor 256 is connected to a reset terminal. Both of the transistors 252, 256 are grounded at their emitter terminals.

The collector terminal of the transistor 252 is connected between the current-output terminal of the constant-current circuit 250 and the anode end of the diode 253. The collector terminal of the transistor 256 is connected to one end of the capacitor 257 having the other end being grounded, and then is split into two which are connected to the cathode end of the diode 253 and the input end of the amplifier 254, respectively. The output end of the amplifier 254 is connected to the input end of the A/D converter 255.

Figure 4:
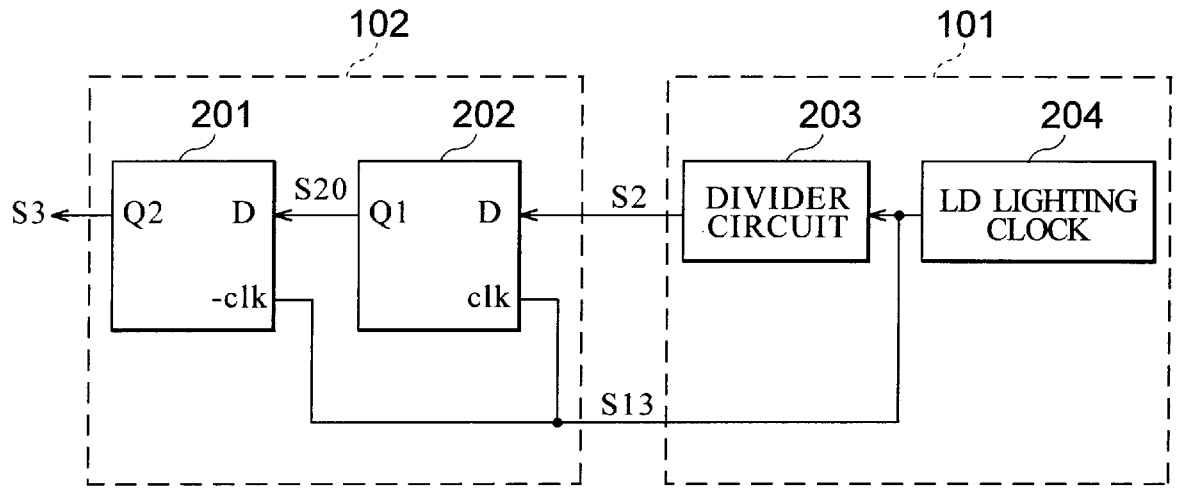
FIG. 4 is a block diagram showing the delay circuit portion of the apparatus shown in FIG. 1.

FIG. 4 is a view showing an example of the delay circuit 102 used in the distance measurement apparatus 100 of this embodiment. Connected to two input terminals of this delay circuit 102 are the output end of the divider circuit 203 (measurement start signal S2) and the output end of the LD lighting clock 204 (clock signal S13) within the time measurement section 101, respectively. The delay circuit 102 is constituted by two D flip-flops 201 and 202 connected in series, such that the Q1 terminal of the input-side D flip-flop 202 and the D terminal of the output-side D flip-flop 201 are connected together, whereby the D terminal of the input-side D flip-flop 202 acts as the other input end of the delay circuit 102, whereas the Q2 terminal of the output-side D flip-flop 201 acts as the output end of the delay circuit 102. The clock signal S13 is fed into each of the clock terminals clk of the D flip-flops 201 and 202.

Figure 5A:
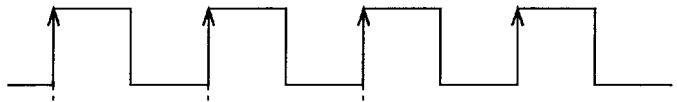
FIGS. 5A to 5D are timing charts for explaining operations of the delay circuit shown in FIG. 4.
Figure 5B:
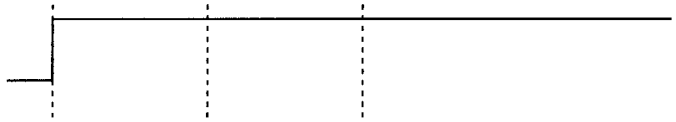
Figure 5C:
Figure 5D:
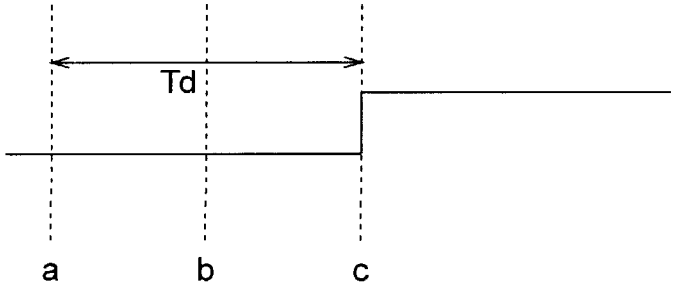

Operations of the delay circuit 102 will now be explained with reference to FIGS. 4 and 5A to 5D. The clock signal S13 outputted from the LD lighting clock 204 is a square wave pulse signal having a constant pulse width and a constant pulse interval as shown in FIG. 5A. As shown in FIG. 5B, the measurement start signal S2 is obtained when the clock signal S13 is divided by the divider circuit 203, and rises at a time a simultaneously with the clock signal S13. Namely, it is a signal synchronized therewith having a larger pulse width. The D flip-flop 202 delays the signal S2 inputted from its D terminal by one clock of the clock signal S13 inputted from its clk terminal, thereby generating the signal S20 shown in FIG. 5C and outputs it from the Q1 terminal. The rising time of this signal is the generating time b of the clock signal next to the time a. The D flip-flop 201 delays the signal S2 inputted from its D terminal further by one clock of the clock signal S13 inputted from its clk terminal, thereby generating the signal S3 shown in FIG. 5D and outputs it from the Q2 terminal. The rising time of this signal is the generating time c of the clock signal next to the time k. As a result, the delay time Td of the delay signal S3 corresponds to the time for two clocks of the clock signal S13. By combining the divider circuit and D flip-flops, the delay time Td can be set to the time corresponding to any clock number.

Though a circuit in which a clock having a stable frequency delays the necessary clock number is explained here, it can also be delayed with the aid of a delay device having a stable delay time or an I/O port of a microcomputer.

Operations of the distance measurement apparatus in accordance with the first embodiment will now be explained with reference to FIGS. 1 to 3 and 6A to 6J. FIGS. 6A to 6J are time charts for measurement operations of the distance measurement apparatus 100.

First, the microprocessor 115 generates the measurement start command S1 and transmits it to the time measurement section 101. Within the time measurement section 101, the reference clock 211 has generated the reference clock signal S30 shown in FIG. 6A, and the divider circuit 203 has divided the clock signal S13 so as to generate the measurement start signal S2 shown in FIG. 6B as mentioned above. In the following, the clock cycle of the reference clock 211 will be represented by ΔT. Since the LD lighting clock 204 and the reference clock 211 are not completely in synchronization with each other, the rising of the measurement start signal S2 does not always coincide with the rising of the reference clock signal S30. As mentioned above, when the delay circuit 102 delays this measurement start signal S2 by the time Td, then the delay signal S3 shown in FIG. 6C is obtained. Here, if the frequency of the clock signal S13 for the LD is set smaller than the frequency of the clock signal S30 of the reference clock 211, then the time Td can be made greater than two clocks of the reference clock 211.

The laser drive circuit 103 receives the delay signal S3, and generates and outputs the laser drive signal S4 synchronized therewith. In response to this drive laser signal S4, the laser diode 104 lights in a pulsing fashion, thereby emitting the pulsed light L1 shown in FIG. 6D to the first light-transmitting optical system 105. Namely, the delay signal S3 is an emission trigger signal for the laser diode 104, so to speak.

In the first light-transmitting optical system 105, the pulsed light L1 is split into the inner optical path and the outer optical path. The optical path switching sector 106 is disposed on one of the optical paths, so as to select the effective optical path. The case where the outer optical path is selected will be explained by way of example in the following.

The pulsed light L2 on the outer optical path side split by the first light-transmitting optical system 105 is emitted to the target 114 to be measured as the pulsed light L4 by way of the second light-transmitting optical system 107. Part of the reflected pulsed light L5 reflected by the surface of the target 114 is guided to the first light-receiving optical system 108. The pulsed light L6 emitted out of the first light-receiving optical system 108, with its light quantity adjusted by the outer optical attenuator 109, becomes the pulsed light L7 having a predetermined intensity and is guided, by way of the second light-receiving optical system 110, to the photoelectric converter section 111 as the pulsed light L8.

In the photoelectric converter section 111, the pulsed light L8 is converted into the light-receiving signal S5 shown in FIG. 6E, which is an electric signal. The amplifier section 112 outputs the signal S8, in which the light-receiving signal S5 has been amplified, to the comparator section 113 and the intensity signal S6 proportional to the intensity of the light-receiving signal S5 to the level detection circuit 117.

Here, the level detection circuit 117 outputs to the optical attenuator 109 the control signal S7 for adjusting the transmissivity of the attenuator 109 such as to make it lower and higher when the intensity of the signal S6 is higher and lower, respectively. As a result, the intensity of the pulsed light L7 emitted from the attenuator 109 is held substantially constant due to feedback control, whereby the intensities of the signals S5 and S6 are kept substantially constant.

The comparator section 113 detects a peak of the inputted signal S8, and generates and outputs the measurement stop signal S9 that switches from Low level to High level at this peak point as shown in FIG. 6F.

With the measurement start signal S2 and the reference clock signal S30 having been inputted therein, the start-side fractional time signal generator 212 within the time measurement section 101 generates the start-side fractional time signal S31 shown in FIG. 6G having such a waveform that switches to High level when the measurement start signal S2 attains High level and then switches to Low level at the point in time where the second reference clock therefrom is generated, i.e., after the lapse of time Ta. As the start-side fractional time signal S31 is switched to Low level not at the point in time immediately where the reference clock switches to a High level but at the point in time where the next reference clock is generated, the pulse width Ta of the signal pulse of the start-side fractional time signal S31 would be at least one clock but less than two clocks of the reference clock signal S30, whereby pulse widths which will be mentioned later can correctly be detected.

With the measurement stop signal S9 and reference clock signal S30 having been inputted therein, the stop-side fractional time signal generator 217 within the time measurement section 101, as with the start-side fractional time signal generator 212, outputs the stop-side fractional time signal S32 shown in FIG. 6H having such a waveform that it switches to a High level when the measurement stop signal S9 attains a High level and then switches to Low level at the point in time where the second reference clock therefrom is generated, i.e., after the lapse of time Tb. Namely, the pulse width of the stop-side fractional time signal S32 is Tb. In the following, the elapsed time from when the measurement start signal S2 attains High level until the measurement stop signal S9 attains High level is represented by T, whereas the elapsed time from when the delay signal S3 attains a High level until the measurement stop signal S9 attains High level is represented by Te.

In this embodiment, when the delay time Td is set to at least two clocks of the reference clock signal S30, then Td>Ta, whereby the pulsed light L1 is emitted after the pulse of the start-side fractional time signal S31 ends. As a result, the rising of the stop-side fractional time signal S32 is separated from the falling of the start-side fractional time signal S31 in terms of time at least by the period between the emission and receiving of the pulsed light. Therefore, the fractional time signals S31 and S32 would not interfere with each other, whereby their pulse widths can be measured correctly.

These fractional time signals S31 and S32 are fed into the S and R terminals of the SR flip-flop 214, respectively. As a result, the Q terminal of the SR flip-flop 214 outputs the gate signal S33 shown in FIG. 6I, which switches from Low level to High level at the point in time where the signal S31 switches from High level to Low level, and switches from High level to Low level at the point in time where the signal S32 switches from High level to Low level. The points in time where the signals S31 and S32 switch from their High level to Low level coincide with their respective ones of clock generating points of the reference clock signal S30. As a consequence, the gate signal S33 has a pulse width Tc which is an integral multiple of the cycle $\Delta T$ for one clock of the reference clock signal S30, and the rising thereof coincides with the rising of the clock signal S30. The AND circuit 215 passes the reference clock signal S30 therethrough only when the gate signal S33 is at High level, thereby outputting the rough count signal S34 shown in FIG. 6J to the counter 216. The counter 216 counts the pulse number N of thus inputted rough count signal S34 and outputs a digital signal corresponding to thus counted value N as the signal S11.

On the other hand, the time/voltage converters 213, 218 output the digital signals S10, S12 corresponding to the pulse widths of their inputted signals S31, S32, i.e., times Ta, Tb, respectively. By way of example, operations of the time/voltage converter 213 will now be explained. The inverter 251 outputs to the base terminal of the transistor 252 the signal S34 in which the signal S31 has been inverted. Since the transistor 252 becomes nonconductive only when the signal S34 is at Low level, the capacitor 257 is charged with the current of the constant-current circuit 250 during this period via the diode 253. As a consequence, the charging voltage of the capacitor 257 becomes the analog voltage signal S35 proportional to the pulse width Ta of the signal S31. This analog voltage signal S35 is amplified by the amplifier 254 and is fed into the A/D converter 255. As a result, the A/D converter 255 outputs the digital signal S10 corresponding to the pulse width Ta of the signal S31. Here, after each measurement operation is completed, the charging voltage of the capacitor 257 is reset by the transistor 256.

As a result, the digital signal S10 indicative of the start-side fractional time Ta, the digital signal S11 indicative of the clock number N of the rough count signal S34, and the digital signal S12 indicative of the stop-side fractional time Tb are inputted in the microprocessor 115. From the relationships shown in FIGS. 6A to 6F, the following simultaneous equations are derived:

$$T=Td+Te$$

$$T+Tb=Ta+Tc$$

$$Tc=N\times\Delta T \quad (1)$$

Thus, the time Te from the emission of a pulse to the receiving thereof can be calculated by the following equation:

$$Te=Ta+N\times\Delta T-Tb-Td \quad (2)$$

Since the time Te represents the time from the rising of the emission pulse L1 to the peak point of the light receiving signal S5, it differs from the actual time from the emission to receiving in the strict sense. Therefore, when the optical path switching sector 106 is disposed on the outer optical path side to select the inner optical path so that the pulsed light L3 is adjusted to the pulsed light L9 having a predetermined quantity of light with the aid of the inner optical attenuator 116 and then is guided to the second light-transmitting optical system 110, the time Te for light to pass through the inner optical path having a known length can be measured. When the length of the outer optical path is corrected according to thus measured time Te, the distance to the target 114 can be determined. Preferably, the length of the inner optical path is made to coincide with the length of the part of the outer optical path within the apparatus, since the time required for light to travel to the target 114 and return back therefrom can directly be calculated by simply subtracting the Te measured in the inner optical path from the Te measured in the outer optical path. In this case, it is not necessary for the Te in each optical path to be determined beforehand by subtracting Td, since determining Te +Td in both optical paths and yielding the difference therebetween would erase Td, thereby simplifying the calculation in the processing circuit. The digital signal corresponding to thus determined distance is outputted from the OUT terminal of the microprocessor 115.

As shown in FIG. 2, the distance measurement apparatus 100 of this embodiment includes separate fractional time measurement sections 212, 213 and 217, 218 within the time measurement section 101. Namely, the start-side fractional time Ta is measured by the start-side fractional time signal generator 212 and the time/voltage converter 213, whereas the stop-side fractional time Tb is measured by the stop-side fractional time signal generator 217 and the time/voltage converter 218.

For improving the accuracy in measurement, the distance measurement apparatus 100 performs several thousand measurement operations in response to the measurement start command S1 from the microprocessor 115, and outputs their average as the measured value. If the measurement sections for both fractional times Ta and Tb are unified, a sufficient span of time will be necessary between the falling edge of signal S31 and the rising edge of signal S32 in order to secure the discharging time accompanying the resetting of the capacitor 257 and the conversion time in the A/D converter 255. As a consequence, the measurement time will inevitably elongate.

In this embodiment, as the start-side fractional time Ta and the stop-side fractional time Tb are measured by their respective fractional time measurement sections, the falling edge of start-side fractional time signal S31 and the rising edge of stop-side fractional time signal S32 can be made as close to each other as possible in terms of time while separating them from each other in terms of time to such an extent that the conventional erroneous measurement can be prevented from occurring. Namely, the delay time Td of the delay circuit 102 can be made as short as possible to such an extent that the falling edge of signal S31 and the rising edge of signal S32 would not overlap each other, whereby the time required for a plurality of measurement operations can be shortened.

Figure 7:
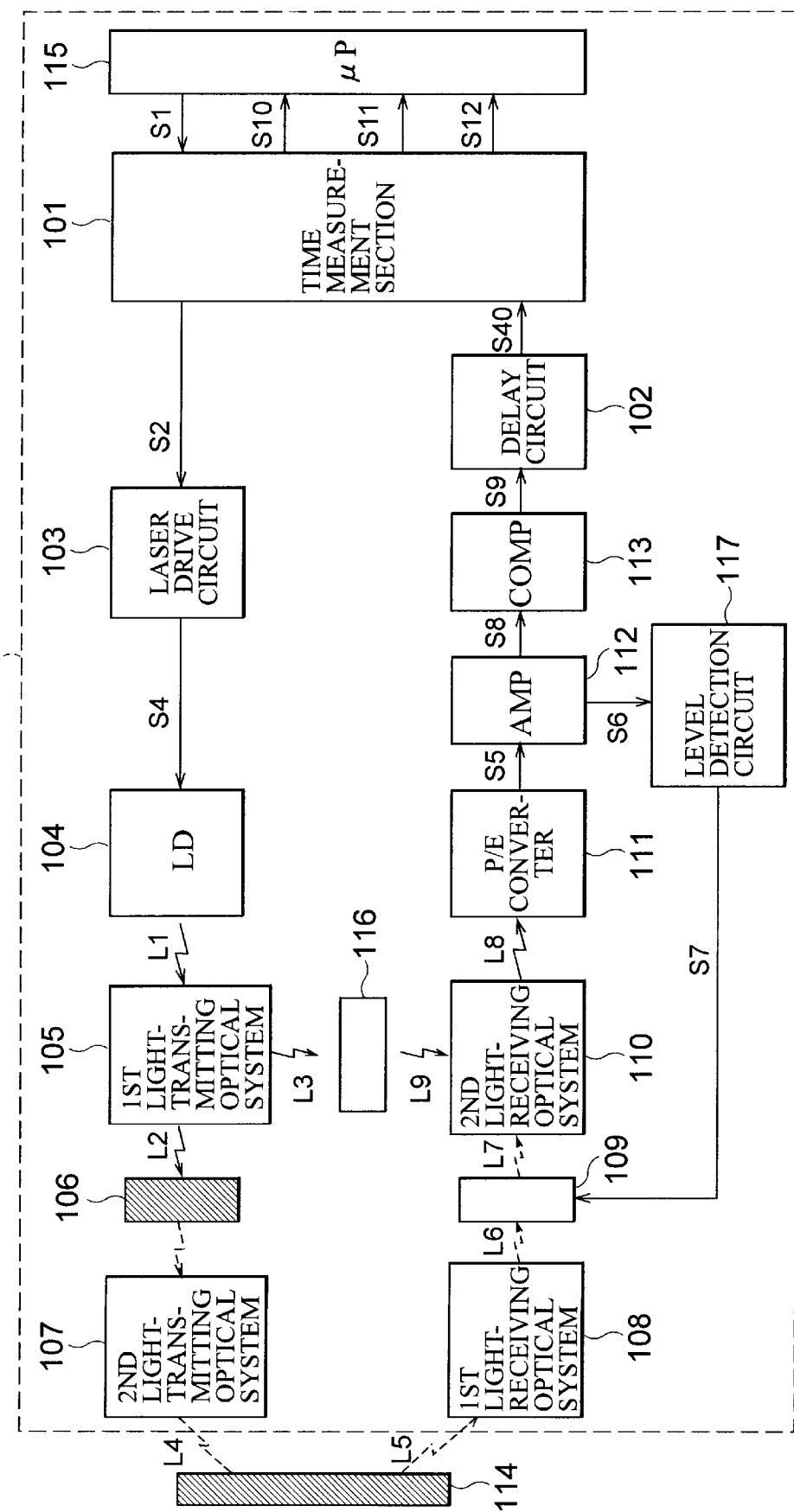
FIG. 7 is a block diagram showing a second embodiment of the distance measurement apparatus in accordance with the present invention.

FIG. 7 is a block diagram showing a second embodiment of the distance measurement apparatus in accordance with the present invention. It indicates the state of this apparatus 100a where the optical path switching sector 106 is disposed on the outer optical path side to select the inner optical path.

In this embodiment, differently from the first embodiment shown in FIG. 1, the delay circuit 102 is inserted between the comparator section 113 and the time measurement section 101. The delay circuit 102 constituted by a coil and a condenser delays, by the delay time Td, the comparator signal S9 outputted at the peak point of the light-receiving signal S5, and outputs a measurement stop signal S40 to the time measurement section 101. The delay time Td is at least two clocks of the reference clock signal S30 in this embodiment as well.

FIGS. 8A to 8J are time charts indicating measurement operations of the distance measurement apparatus 100a. In this embodiment, according to the measurement start signal S2 shown in FIG. 8B, the laser drive circuit 103 drives the LD 104 so as to make it generate the emission pulse signal L1 shown in FIG. 8C. The subsequent processing until the comparator section 113 generates the comparator signal S9 is similar to that of the first embodiment. This can also be seen from the fact that the timing charts of FIGS. 8C to 8E have a relationship corresponding to that of the timing charts of FIGS. 6D to 6F. The comparator signal S9 is delayed by the delay circuit 102 by the delay time Td and is outputted as the measurement stop signal S40 shown in FIG. 8F. The processing operations of determining Ta, Tb, Tc, and N, which are information data necessary for distance calculation data, from thus generated measurement start signal S2 and measurement stop signal S40 are similar to those of the first embodiment and have relationships shown in FIGS. 8A to 8J. As a consequence, equation (1) holds true in this embodiment as well, so that the time from the emission of a pulse to the receiving thereof can be determined from equation (2), whereby the distance to the target 114 can be calculated with high accuracy.

In this embodiment, the measurement stop signal S40 shown in FIG. 8F is delayed by the delay time Td from the peak point of the light-receiving signal S5 shown in FIG. 8D. The pulse width Ta of start-side fractional time signal S31 shown in FIG. 8G is less than two clocks of the reference clock signal S30 shown in FIG. 8A as with the first embodiment, whereby the start-side fractional time signal S31 would not overlap the stop-side fractional time signal S32 shown in FIG. 8H. Hence, their measurement times are made closer to each other, while errors in measurement are prevented from occurring upon simultaneous switching, so that measurement can be effected in a short time with high accuracy.

Figure 9:
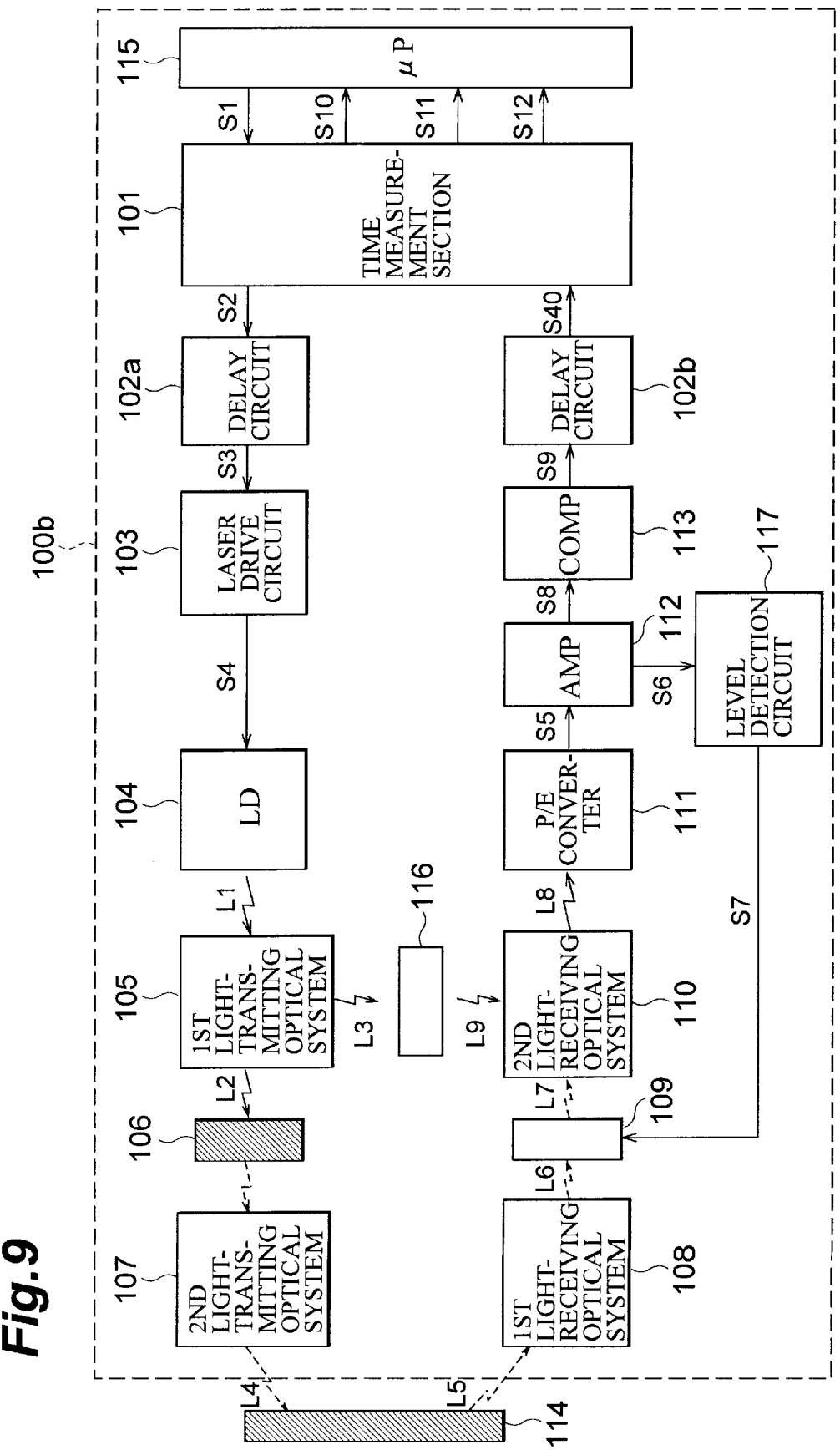
FIG. 9 is a block diagram showing a third embodiment of the distance measurement apparatus in accordance with the present invention.

FIG. 9 is a block diagram showing a third embodiment of the distance measurement apparatus in accordance with the present invention. In the distance measurement apparatus 100b of this embodiment, differently from the first and second embodiments respectively shown in FIGS. 1 and 7, delay circuits 102a and 102b are disposed between the time measurement section 101 and the laser drive circuit 103 and between the comparator section 113 and the time measurement section 101, respectively. The delay circuit 102a is constituted by a single D flip-flop 202 alone, for example, such that the input signal fed into the D terminal is outputted from the Q terminal as being delayed by one clock of the clock signal inputted from the clk terminal. The delay circuit 102b is constituted by a coil and a capacitor, for example, such that the input signal S9 is outputted as signal S10 with predetermined time delay. In the following, the case where the delay time in each delay circuit is identically Td/2 will be explained by way of example.

FIGS. 10A to 10K are timing charts for measurement operations of the distance measurement apparatus 100b in this embodiment. As can be seen from FIGS. 10A to 10K, equation (1) holds true in this embodiment as well, so that the time from the emission of a pulse to the receiving thereof can be determined from equation (2) and, based thereon, the distance to the target 114 can be calculated with high accuracy.

The shorter is the delay time of the delay circuit, the higher becomes its temporal accuracy. Therefore, a plurality of delay circuits each having a short delay time may be used for generating delay time Td with higher accuracy. Though an example providing the same delay time in both of the light-transmitting and light-receiving sides is explained here, their respective delay times may be made different from each other.

Figure 11:
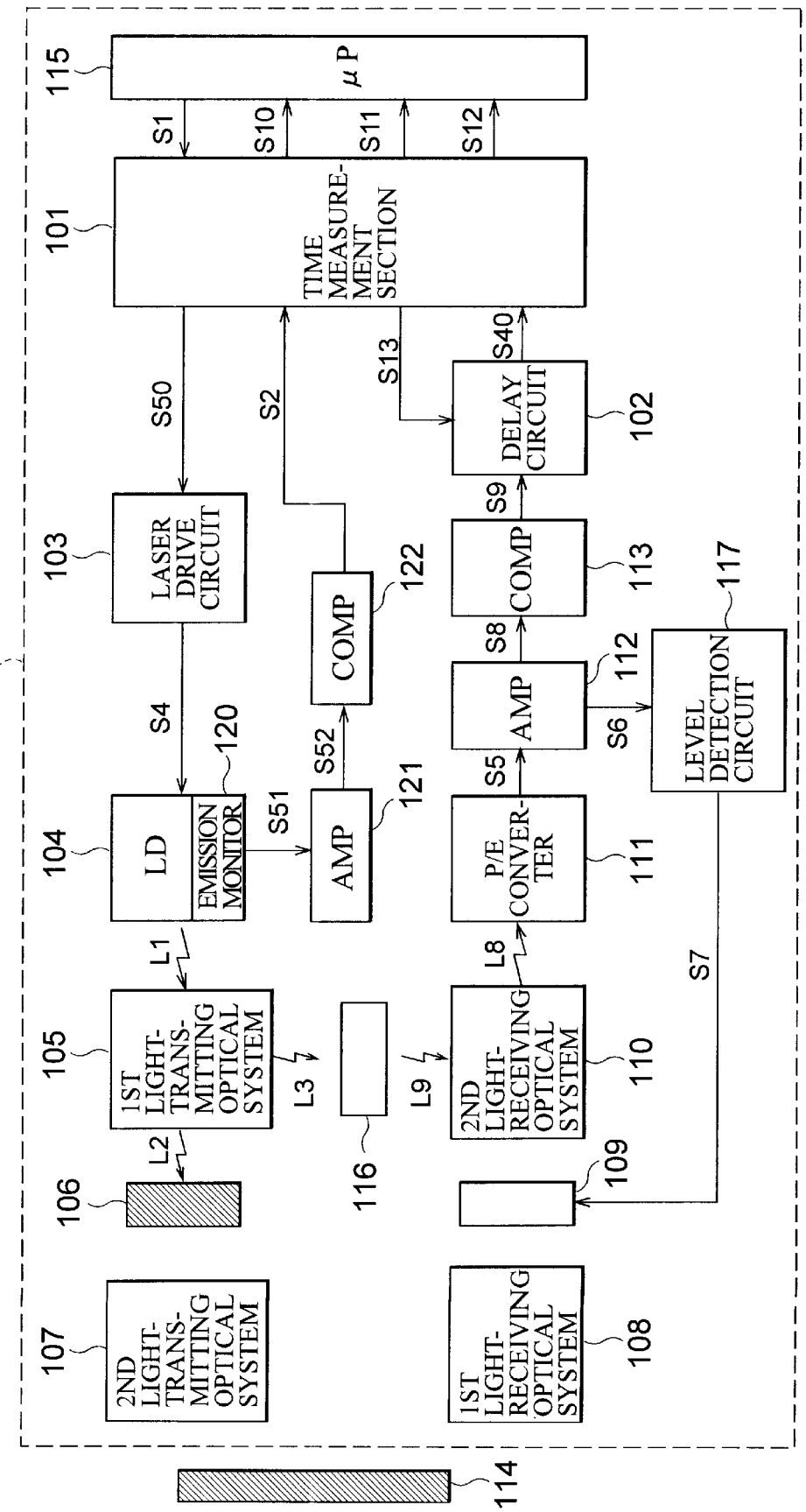
FIG. 11 is a block diagram showing a fourth embodiment of the distance measurement apparatus in accordance with the present invention.
Figures 14A, 14B:
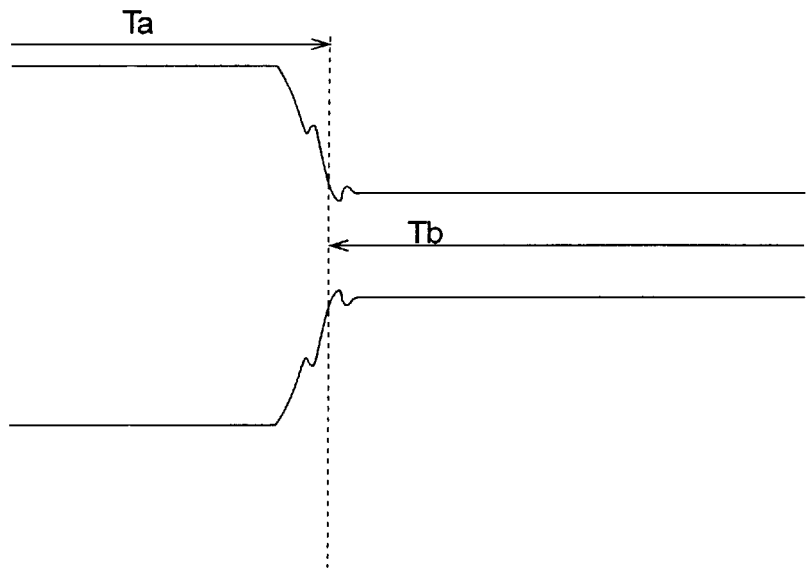
FIGS. 14A and 14B are views for explaining simultaneous switching in the conventional distance measurement apparatus.

FIG. 11 is a block diagram showing a fourth embodiment of the distance measurement apparatus in accordance with the present invention. This distance measurement apparatus 100c differs from the distance measurement apparatus 100a of the second embodiment shown in FIG. 7 in that it has an emission monitor 120 for monitoring the emission of LD and outputting the emission signal S51, an amplifier 121 for outputting a signal S52 in which the emission signal S51 is amplified and its waveform is shaped, and a comparator section 122 for generating the measurement start signal S2 according to the signal value S52 and outputting it to the time measurement section 101.

FIGS. 12A to 12M show timing charts for measurement operations of this distance measurement apparatus 100c. The time measurement section 101 outputs the laser emission trigger signal S50 shown in FIG. 12B to the laser drive circuit 103. According to this trigger signal S50, the laser drive circuit 103 outputs the laser drive signal S4, thereby causing the LD 104 to effect pulse emission (FIG. 12C). The emission monitor 120 attached to the LD 104 outputs the emission monitor signal S51 in response to this pulseemission. The amplifier 121 receives this signal S51, shapes its waveform, amplifies thus shaped signal, and outputs thus amplified signal as the signal S52. The comparator section 122 outputs the measurement start signal S2 that switches from Low level to High level at the point in time where the level of signal S52 is at a threshold or higher. The other operations are similar to those of the second embodiment shown in FIGS. 8A to 8J.

In this embodiment, the actual emission of the LD 104 is monitored, and the measurement start signal is generated on the basis thereof. Therefore, even when a difference is generated between the rising of trigger signal and the rising of emission pulse and is variable, the measurement start signal corresponding to the emission can correctly be generated. Hence, correct measurement can be effected independently of the emission condition of LD.

As explained in the foregoing, since a predetermined delay time is provided between the measurement start signal and the measurement stop signal, the start-side fractional time signal and the stop-side fractional time signal would not overlap each other in terms of time in the present invention.

As a consequence, errors in measurement are prevented from occurring upon simultaneous switching, whereby accuracy in short distance measurement would improve. Also, as separate fractional time measurement sections are provided, the total measurement time can be shortened.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A distance measurement apparatus for emitting pulsed light to a target, receiving the pulsed light reflected by said target, and measuring a time (Te) elapsed from the emission of pulsed light until the receiving thereof, thereby determining a distance to said target, said apparatus comprising:

a light-emitting section for emitting the pulsed light toward said target in response to an emission trigger signal based on a measurement start signal;

a light-receiving section for outputting a measurement stop signal in response to the receiving of the pulsed light reflected by said target;

a delay circuit for delaying one of (1) a generation of said emission trigger signal with respect to said measurement start signal and (2) the outputting of said measurement stop signal with respect to the receiving of said reflected pulsed light by a fixed delay time (Td);

a reference clock section for generating reference clock pulses having a fixed period ($\Delta T$);

a start-side fractional time signal generating section for outputting a start-side fractional time signal pulse having a rising edge corresponding to said measurement start signal and a falling edge corresponding to said reference clock pulse so as to set the width (Ta) of a start-side fractional time signal pulse longer than the period ($\Delta T$) of said reference clock pulses and shorter than the delay time (Td) of said delay circuit;

a start-side fractional time measurement section for measuring a pulse width (Ta) of said start-side fractional time signal pulse;

a stop-side fractional time signal generating section for outputting a stop-side fractional time signal pulse having a rising edge corresponding to said measurement stop signal and a falling edge corresponding to said reference clock pulse so as to set the width (Tb) of stop-side fractional time signal pulse longer than the period ($\Delta T$) of said reference clock pulses;

a stop-side fractional time measurement section for measuring a pulse width (Tb) of said stop-side fractional time signal pulse;

a counter section for counting said reference clock pulse (N) from a trailing edge of said start-side fractional time signal pulse to that of said stop-side fractional time signal pulse; and a distance measurement section for determining a distance to said target by the time (Te) according to the outputs of said start-side and stop-side fractional time measurement sections and said counter section.

2. A distance measurement apparatus according to claim 1, wherein the distance measurement section determines the time (Te) by Te=Ta+N×$\Delta T$−Tb−Td.

3. A distance measurement apparatus for emitting pulsed light to a target, receiving the pulsed light reflected by said target, and measuring a time (Te) elapsed from the emission of pulsed light until the receiving thereof, thereby determining a distance to said target, said apparatus comprising:

a light-emitting section for emitting the pulsed light toward said target in response to an emission trigger signal;

an emission detecting section for outputting a measurement start signal in response to the emission of said light-emitting section;

a light-receiving section for outputting a measurement stop signal in response to the receiving of the pulsed light reflected by said target;

a delay circuit for delaying the outputting of said measurement stop signal by a fixed delay time (Td);

a reference clock section for generating a reference clock pulses having a fixed period ($\Delta T$);

a start-side fractional time signal generating section for outputting a start-side fractional time signal pulse having a rising edge corresponding to said measurement start signal and a falling edge corresponding to said reference clock pulse so as to set the width (Ta) of start-side fractional time signal pulse longer than the period ($\Delta T$) of said reference clock pulses and shorter than the delay time (Td) of said delay circuit;

a start-side fractional time measurement section for measuring a pulse width (Ta) of said start-side fractional time signal pulse;

a stop-side fractional time signal generating section for outputting a stop-side fractional time signal pulse having a rising edge corresponding to said delayed measurement stop signal and a falling edge corresponding to said reference clock pulse so as to set the width (Tb) of stop-side fractional time signal pulse longer than the period ($\Delta T$) of said reference clock pulses;

a stop-side fractional time measurement section for measuring a pulse width (Tb) of said stop-side fractional time signal pulse;

a counter section for counting said reference clock pulses (N) from a trailing edge of said start-side fractional time signal pulse to that of said stop-side fractional time signal pulse; and a distance measurement section for determining a distance to said target by the time (Te) according to the outputs of said start-side and stop-side fractional time measurement sections and said counter section.

4. A distance measurement apparatus according to claim 3, wherein the distance measurement section determines the time (Te) by Te=Ta+N×$\Delta T$−Tb−Td.

5. A distance measurement apparatus emitting pulsed light to a target, receiving the pulsed light reflected by said target, and measuring a time (Te) elapsed from the emission of pulsed light until the receiving thereof, thereby determining a distance to said target, said apparatus comprising:

a light-emitting section for emitting the pulsed light toward said target in response to an emission trigger signal based on a measurement start signal;

a light-receiving section for outputting a measurement stop signal in response to the receiving of the pulsed light reflected by said target;

a first delay circuit for delaying a generation of said emission trigger signal with respect to said measurement start signal by a fixed delay time (Td1);

a second delay circuit for delaying an outputting of said measurement stop signal with respect to the receiving of said reflected pulsed light by a fixed delay time (Td2);

a reference clock section for generating a reference clock pulses having a fixed period ($\Delta T$);

a start-side fractional time signal generating section for outputting a start-side fractional time signal pulse having a rising edge corresponding to said measurement start signal and a falling edge corresponding to said reference clock pulse so as to set the width (Ta) of start-side fractional time signal pulse longer than the period ($\Delta T$) of said reference clock pulses and shorter than the sum of the delay times (Td1+Td2) of said delay circuits;

a start-side fractional time measurement section for measuring a pulse width (Ta) of said a start-side fractional time signal pulse;

a stop-side fractional time signal generating section for outputting a stop-side fractional time signal pulse having a rising edge corresponding to said measurement stop signal and a falling edge corresponding to said reference clock pulse so as to set the width (Tb) of stop-side fractional time signal pulse longer than the period ($\Delta T$) of said reference clock pulses;

a stop-side fractional time measurement section for measuring a pulse width (Tb) of said stop-side fractional time signal pulse;

a counter section for counting said reference clock pulses (N) from a trailing edge of said start-side fractional time signal pulse to that of said stop-side fractional time signal pulse; and a distance measurement section for determining a distance to said target by the time (Te) according to the outputs of said start-side and stop-side fractional time measurement sections and said counter section.

6. A distance measurement apparatus according to claim 5, wherein the distance measurement section determines the time (Te) by Te=Ta+N×$\Delta T$−Tb−(Td1+Td2).

* * * * *